United States Patent [19]

Katagiri et al.

[11] Patent Number: 4,840,326

[45] Date of Patent: Jun. 20, 1989

[54] MAGNETIC TAPE CASSETTE

[75] Inventors: Shingo Katagiri; Keiji Mori; Masahiko Asai, all of Kanagawa, Japan

[73] Assignee: Fuji Photo Film Co., Ltd., Kanagawa, Japan

[21] Appl. No.: 143,475

[22] Filed: Jan. 13, 1988

[30] Foreign Application Priority Data

Jan. 13, 1987 [JP] Japan .................. 62-2484[U]

[51] Int. Cl.⁴ ............................................. G11B 23/04
[52] U.S. Cl. .................................................... 242/199
[58] Field of Search .................. 242/197, 198, 199; 360/132

[56] References Cited

U.S. PATENT DOCUMENTS 4,563,718  1/1986  Shirako ............................ 360/132
4,607,306  8/1986  Shirako .......................... 242/199 X
4,646,190  2/1987  Meguro ........................... 360/132
4,681,280  7/1987  Duurland ......................... 242/199

Primary Examiner—David Werner
Attorney, Agent, or Firm—Sughrue, Mion, Zinn, Macpeak & Seas

[57] ABSTRACT

An magnetic tape cassette of the type in which the tape is wound on flangeless hubs and the tape is pulled out through an opening in the cassette for recording and reproducing having improved tape winding characteristics. An annular projection is formed around each of the flangeless hubs, and a rib having about the same height as the annular projection extends radially outwardly from the radial projection in an area corresponding to the first-wound portion of the tape. The rib keeps the tape from deviating sideways as it is initially wound onto the hub.

6 Claims, 2 Drawing Sheets

MAGNETIC TAPE CASSETTE

BACKGROUND OF THE INVENTION

The present invention relates to a magnetic tape cassette for use with audio equipment or the like. More particularly, the invention relates to an original compact magnetic tape cassette in which a magnetic tape is wound on flangeless hubs and which has a size not larger than a standard Philips-type audio cassette currently in widespread use.

Various types of conventional magnetic tape cassettes for use with video tape recorder, audio equipment, etc., are known. In common video tape cassettes, the magnetic tape is wound on flanged hubs (reels) in the cassette. On the other hand, in compact magnetic tape cassettes intended for audio use or the like, the magnetic tape is wound on a pair of flangeless hubs. In cassettes having flangeless hubs, it is common practice to provide a friction sheet between each of the upper and lower outer body halves of the cassette and the magnetic tape and hubs to maintain desired rotational properties of the hubs to prevent the tape from being irregularly wound on the hubs.

The recent trend is to reduce the size and weight of cassette tape recorders, and accordingly a need for compact magnetic tape cassettes has arisen. Also, there is always a demand for magnetic tape cassettes capable of recording and reproduction with a high quality and high density.

Digital type recorders and magnetic tapes have recently been introduced to meet these demands. In these recorders, the input analog signal is converted to digital form using pulse code modulation. Also, there has recently become available a large-size video tape cassette intended for digital recording. Such cassettes must be capable of recording signals of a much wider bandwidth than audio cassettes, typically about five times as wide. These video tape cassettes, which are generally intended for use in a rotary-head recorder have an opening provided in their front surface which is closed by a guard panel when the cassette is not in use. Such measures to protect the tape are necessary for such digital-type cassettes due to the extremely high recording density and broad frequency spectrum which must be maintained.

It is possible to apply the same type of construction techniques to a wide bandwidth audio cassette of a more compact size no larger than the size of a standard Philips-type cassette. This type of cassette can be used with a rotary-head type audio cassette recorder. In such an audio cassette it is preferable though to employ flangeless hubs in order to reduce the size and weight of the cassette.

However, such audio cassettes suffer from a significant drawback. Since the cassette is used in a rotary head system, it is necessary to pull the tape out of the cassette for recording and reproduction. To improve the fit of the tape against the rotary head, the tape is slightly displaced in the direction of width of the tape by a guide pin. This displacement can give rise to an excessive force acting in the widthwise direction of the tape. The problem is made more severe due to the fact that the pulled-out length of the tape is small due to the reduced size of the cassette and recorder and the attendant reduced distance between the cassette and the head. This excessive force produces an adverse effect on the winding of the tape on the hubs. That is, the tape has a tendency to be wound irregularly on the hubs.

SUMMARY OF THE INVENTION

Accordingly, it is an object of the present invention to provide a magnetic tape cassette in which the magnetic tape is positively prevented from being wound irregularly and the movement of the tape is maintain smooth.

In accordance with the above and other objects of the invention, there is provided a magnetic tape cassette comprising a pair of flangeless hubs on which the magnetic tape is wound, and annular projections for restricting the positions of the hubs while rotatably supporting the hubs are provided on at least one of the upper and lower inside surfaces of the cassette. Ribs having approximately the same height as the annular projections are provided near the projections with each of the ribs extending in the radial direction of the corresponding hub inwardly and outwardly across the tape winding surface of the hub near the position of the first-wound end portion of the tape, that is, the portion of the tape which is wound on the hub earlier than the other portions of the tape.

DESCRIPTION OF THE PREFERRED EMBODIMENTS

Preferred embodiments of the invention will now be described with reference to the attached drawings.

Figure 1:
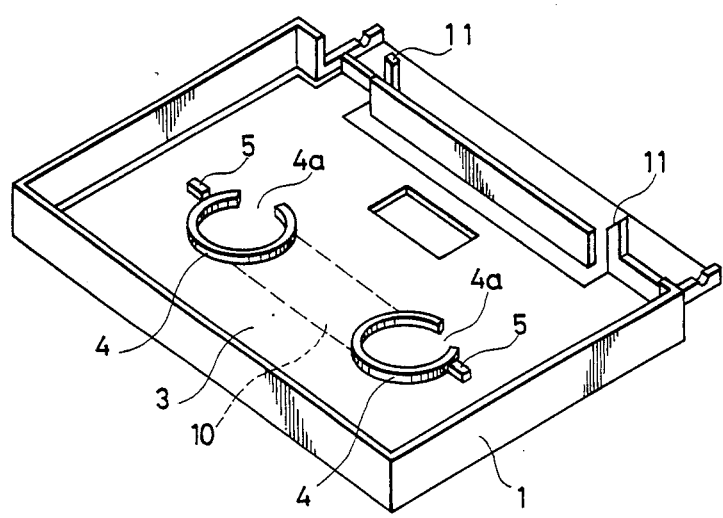
FIG. 1 is a perspective view of an upper half body of a magnetic tape cassette constructed in accordance with the present invention.
Figure 2:
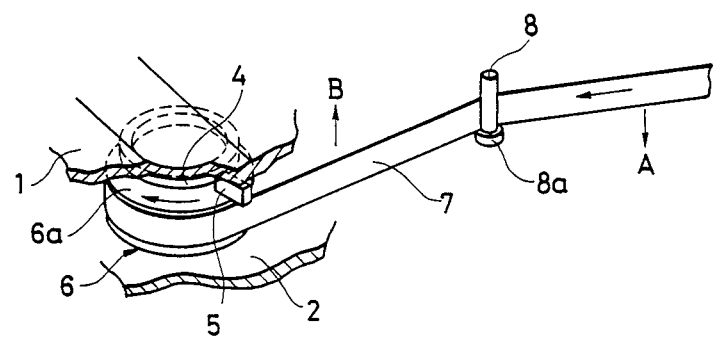
FIG. 2 is a partially cut-away perspective view provided for describing the action of a rib.

FIG. 1 shows a perspective view of the interior of the upper half body 1 of a magnetic tape cassette constructed in accordance with the teachings of the present invention, and FIG. 2 shows a partially cut-away perspective view for describing the action of ribs 5.

The upper half body 1 and a lower half body 2 are combined with each other so that an internal cavity is defined therebetween. A pair of flangeless hubs 6 on which a magnetic tape 7 is wound are provided inside the internal cavity. Friction sheets (not shown) are provided between the upper and lower half bodies 1 and 2. Engaging members (not shown) are provided in the internal cavity to prevent the hubs 6 from being undesirably rotated. A turntable guard panel (not shown) is employed to open and close an opening in the front of the cassette.

As shown in FIG. 1, the upper half body 1 has a window 10 covered by a member 3 made of a transparent or translucent material. The window member 3 is secured to the inside surface of the other portion of the upper half body 1 by ultrasonic bonding or the like.

Annular projections 4 are provided on the upper half body 1, as shown in both FIGS. 1 and 2. Annular projections provided on the tops 6a of the hubs (but not shown in the drawings) are fitted into the annular projections 4 in such a manner that the hubs are rotatably supported by the annular projections 4. Ribs 5 having approximately the same height as the annular projections 4 are provided near the annular projections.

The window member 3 is provided with prisms 11 and has a construction such that it supports the engaging members.

As shown in FIG. 1, the annular projections 4 have notches 4a which engage sharp-pointed portions of the engaging members with the hubs.

Each of the bosses 5 is located near the position of the end portions of the magnetic tape wound on the corresponding hubs 6, that is, the first-wound portions of the tape. The ribs 5 face the tops 6a of the hubs 6. Each of the ribs 5 has a length in the lengthwise direction of the cassette, that is, in a radial direction of the hubs 6, so as to extend slightly across the tape winding surface of the hub but not to the maximum diameter of the wound tape.

The effect of the ribs 5 will now be described.

When the cassette is loaded into a recorder (generally intended here to mean a recording and/or a reproducing apparatus), the magnetic tape 7 is pulled out of the cassette by a tape extracting device of the recorder so as to be placed around a rotary head located in the front of the cassette. At that time, the movement of the tape 7 is restricted by a plurality of guide pins so that the portion of the tape near the rotary head moves below the position of the hub. For that reason, a guide pin 8 having a flange 8a is provided for applying pressure to the lower edge of the tape 7 to lift the tape 7 back to the height of the hubs 6, as shown in FIG. 2.

Although a downward force acts on the portion of the magnetic tape 7 located between the guide pin 8 and the rotary head as indicated by an arrow A in FIG. 2, the flange 8a of the guide pin 8 prevents the tape 7 from deviating from the desired winding path.

The portion of the tape 7 between the guide pin 8 and the hub 6 has a tendency to deviate in an upward direction opposite the direction of the arrow A. It is believed that this is due to a reaction of the contact of the lower edge of the tape 7 and the flange 8a of the guide pin 8 since the rigidity of the tape 7 in the widthwise direction of the tape is increased substantially because the tape pulled out of the cassette is under a tensile force while it is being moved. However, the rib 5 prevents the tape 7 from deviating upwardly (in the direction of an arrow B in FIG. 2) relative to the hub 6 as the tape is being wound on the hub 6. As a result, the tape 7 will always be properly wound on the hub 6.

Generally, it is not necessary to extend the ribs 5 to the outer-diameter regions of the tape since the tendency for unstable winding is substantially less for those regions. Also, if the ribs 5 were extended to the outer-diameter portions of the tape, the clearance for movement of the tape 7 in its widthwise direction would be reduced, thus adversely affecting the movement of the tape 7. That is, even winding of the tape can be obtained with the ribs 5 confined to only the inner-diameter portions of the tape.

Although there is a height difference between the top of the rib 5 and the inside surface of the half body 1, the friction sheet inserted between the rib 5 and hub 6 on one side and the magnetic tape 7 on the other prevents the height difference from hindering the movement of the magnetic tape at about the halfway point of the winding of the tape.

Figure 3:
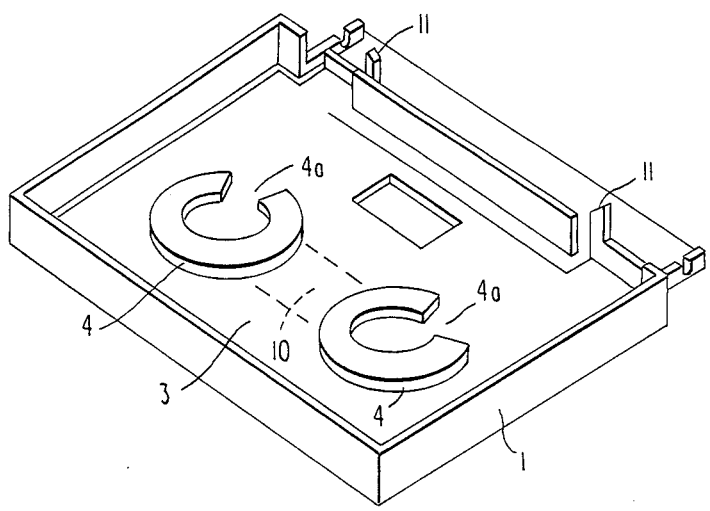
FIG. 3 shows an alternate embodiment of the invention.

In the above-described embodiment, the ribs 5 are provided outside only specific parts of the annular projections 4 and are separated therefrom, the invention is not confined to such an arrangement. For example, the ribs 5 and the annular projections 4 may be continuous with one another and they may have different shapes than those illustrated in the preferred embodiment described above. Also, the width of the annular projections 4 in the radial direction of the hub 6 may be increased so that the annular projections extend outwardly to a diameter equal to the outer edge of the ribs 5, in which case the ribs 5 are omitted, as shown in FIG. 3.

In the magnetic tape cassette constructed in accordance with the present invention, bosses are provided near projections to restrict the positions of rotatably supported flangeless hubs. Each of the ribs extends radially of the corresponding hub across the tape winding surface of the hub in the vicinity of the first-wound portion of the tape. The ribs have substantially the same height as the annular projections. The ribs prevent the magnetic tape pulled out of the cassette from deviating in the widthwise direction of the tape as the tape is being wound. As a result, with the use of the invention, the winding of the tape will always be smooth.

What is claimed is:

1. A magnetic tape cassette comprising: upper and lower half bodies connected together to define a cassette housing; a pair of flangeless hubs rotatably mounted between said upper and lower half bodies; an annular projection for each of said hubs provided on at least one of said upper and lower half bodies; and a rib for each of said hubs having a height substantially the same height as a corresponding annular projection and extending radially of said corresponding annular projection for only a distance corresponding to a first-wound portion of a tape wound on said corresponding hub.

2. The magnetic tape cassette as claimed in claim 1, wherein said rib is joined to said corresponding annular projection.

3. The magnetic tape cassette of claim 1, wherein said rib extends radially outwardly from said corresponding annular projection towards a most closely adjacent side edge of said cassette.

4. A magnetic tape cassette as claimed in claim 1, wherein said rib for each of said hubs extends radially of said corresponding annular projection for distance less than a maximum outer diameter of said tape when completely wound on either of said pair of hubs.

5. A magnetic tape cassette comprising: upper and lower half bodies connected together to define a cassette housing; a pair of flangeless hubs rotatably mounted between each of said upper and lower half bodies; an annular projection for each of said hubs provided on at least one of said upper and lower half bodies; and a rib for each of said hubs having a height substantially the same height as a corresponding annular projection and extending radially of said corresponding annular projection for a distance corresponding to a first wound portion of a tape wound on said corresponding hub, wherein said rib is separated from said corresponding annular projection.

6. A magnetic tape cassette comprising: upper and lower half bodies connected together to define a cassette housing; a pair of flangeless hubs rotatably mounted between each of said upper and lower half bodies; an annular projection for each of said hubs provided on at least one of said upper and lower half bodies; and a rib for each of said hubs having a height substantially the same height as a corresponding annular projection and extending radially of said corresponding annular projection for a distance corresponding to a first wound portion of a tape wound on said corresponding hub, wherein said rib comprises an annular extension of said corresponding annular projection.

* * * * *